United States Patent
Cabello-Fuentes

(10) Patent No.: US 7,713,416 B2
(45) Date of Patent: May 11, 2010

(54) PROCESS FOR TRANSFORMING SLUDGE INTO NPK TYPE GRANULATED FERTILIZER

(75) Inventor: José Cabello-Fuentes, Tamaulipas (MX)

(73) Assignee: Chemical Biosolids Inc., Edinburg, TX (US)

( * ) Notice: Subject to any disclaimer, the term of this patent is extended or adjusted under 35 U.S.C. 154(b) by 675 days.

(21) Appl. No.: 11/509,757

(22) Filed: Aug. 25, 2006

(65) Prior Publication Data

US 2007/0044526 A1  Mar. 1, 2007

Related U.S. Application Data

(63) Continuation-in-part of application No. 10/366,057, filed on Feb. 13, 2003, now Pat. No. 7,175,683.

(51) Int. Cl.
| | |
|---|---|
| C02F 3/00 | (2006.01) |
| B01D 15/00 | (2006.01) |
| B01J 39/00 | (2006.01) |
| C02F 1/42 | (2006.01) |
| B01D 21/00 | (2006.01) |
| C02F 1/52 | (2006.01) |
| B03D 3/00 | (2006.01) |
| C02F 1/68 | (2006.01) |
| C02F 1/76 | (2006.01) |
| B01D 37/00 | (2006.01) |
| C02F 1/00 | (2006.01) |
| C05D 9/02 | (2006.01) |
| C05F 11/00 | (2006.01) |
| C05F 3/00 | (2006.01) |
| A61L 2/00 | (2006.01) |
| A61L 2/18 | (2006.01) |
| A61L 9/00 | (2006.01) |

(52) U.S. Cl. .......... 210/609; 210/613; 210/667; 210/710; 210/711; 210/724; 210/737; 210/752; 210/768; 210/770; 210/916; 71/11; 71/12; 422/28; 422/32

(58) Field of Classification Search .......... 71/9, 71/11, 12, 13, 15, 21–24, 28, 29, 31, 37, 71/42, 43, 61; 210/609, 613, 631, 667, 710, 210/711, 721, 725, 737, 752, 764, 768, 770, 210/916; 422/28, 32
See application file for complete search history.

(56) References Cited

U.S. PATENT DOCUMENTS

| 3,922,221 A | 11/1975 | Rosler et al. |
| 4,038,180 A | 7/1977 | Talbert |
| 5,248,906 A | 9/1993 | Mahmood |
| 5,385,673 A | 1/1995 | Fergen |
| 5,417,861 A | 5/1995 | Burnham |
| 5,466,273 A * | 11/1995 | Connell .......... 71/11 |
| 5,984,992 A | 11/1999 | Greer et al. |
| 6,398,840 B1 | 6/2002 | Orta-Castro et al. |

* cited by examiner

*Primary Examiner*—Stanley Silverman
*Assistant Examiner*—Jennifer A Smith
(74) *Attorney, Agent, or Firm*—Young & Thompson

(57) ABSTRACT

A process for transforming sludge into NPK type granulated fertilizer in which the energy consume is reduced a 90% thanks to the addition of a special filtration step in which the water content is reduced a 50% and the remaining water is evaporated by the exothermic reaction occurring in the process. Additionally, the process of the present invention includes mechanisms that allow some of the by products generated by some of the reactions, to adsorb crystallization water and reduce the humidity of the mass without using external energy.

22 Claims, 1 Drawing Sheet

PROCESS FOR TRANSFORMING SLUDGE INTO NPK TYPE GRANULATED FERTILIZER

This application is a continuation-in-part (CIP) of application Ser. No. 10/366,057, now U.S. Pat. No. 7,175,683, filed Feb. 13, 2003, which claims benefit to the foreign filed application in Mexico-NL/A2002000017, filed May 28, 2002.

BACKGROUND OF THE INVENTION

A. Field of the Invention

The present invention is related to processes for the treatment of sludge coming from waste water treatment plants, and more particularly to a process in which the sludge produced by waste water treatment plant thickeners containing an average 2% solid content are immediately disinfected using as bioicides: heat and mineral acids which are subsequently neutralized by adding a calcium hydroxide slurry enriched with magnesium.

B. Description of the Related Art

The disposal of organic waste such as sludge produced by municipal waste water treatment plants on arable lands and aquiferous layers, is subject to strict sanitary regulations, not only due to its high content of pathogen microorganisms and germs which represent a serious health risk, but for its high organic and nutrient content that propitiates disorganized biological growths which consume high amounts of oxygen and causes the death of most living beings existing in the medium in which the organic waste was discharged.

There are several well defined processes for treating sludge produced by waste water treatment plants that accomplishes all ecological rules and governmental regulations. All these processes have a common centrifugation or filtration step before the sterilization step is carried out, which raises the sludge solid content from 2.0% to an average 20%.

The disposal of the sludge is actually carried out using the following processes:

a) Land Fill.

This process consists on confining a filtered sludge having a solid content of 20% in a field having the following characteristics: a low permeability, absence of geological faults, very low volumes of rainfall, and located far away from towns and cities in order to avoid the pollution of auriferous layers with possible leaks of polluted liquid from the land fill. In US it is not allowed to dispose liquid sludge having a solid content of 2.0% without carrying out sterilization with lime or chloride.

Obviously, before the disposal of the sludge in the field, the surface of the field must be sealed with a waterproof and flexible plastic film, and after the deposit of each sludge layer, it has to be applied a very thick soil layer.

Among some of the disadvantages of the above referred process are: its high investment cost, its high operation cost and its null economic profit.

b) Sludge Drying Beds.

Drying beds are the most widely. used method of sludge dewatering in the United States. Sludge drying beds are typically used to dewater filtered sludge having a solid content of 20%. After drying, the sludge is removed and either disposed of in a land fill. The most commonly used type of dry bed is the sand drying beds, which are generally used for servicing small and medium-sized communities. In a typical sand drying bed, the sludge must be placed on the bed at a depth no greater than 60 cm in order to guarantee the evaporation of the water. Although the principal advantage of the drying bed is its low cost, it is highly pollutant to the environment and the dry product cannot be used due to its high content of polluting agents such as bacteria and viruses.

c) Compost

This process comprises the steps of mixing a filtered sludge having a solid content of 20% with pasture and exposing the mix to solar heat in order to provoke a biologic decomposition or fermentation of organic matter, by which the temperature of the mass is raised to between about 70 to 75.degree. C., thus destroying pathogen microorganisms and obtaining a product whose use is restricted to improve the quality of soil with organic matter due to its very low content (near 2.5% in dry basis) of major nutrients: nitrogen, phosphorous and potassium. Furthermore, when the compost is added to the soil, it is necessary to add chemical fertilizers in order to avoid affecting the quality of the soil.

This process has the disadvantage of using high volumes of pasture and having high transportation costs derived form transporting and distributing a very humid product and of a very low nutrient content.

d) Pasteurization.

This process comprises the steps of mixing a filtered sludge having a solid content of 20% with pasture; heating the resultant mix with steam and fast cooling the heated mix in order to eliminate all the pathogen microorganisms contained in the sludge and obtain a fertilizer called Compost free of any bacteriological polluting agent.

However, this process is recommended for using in low capacity wastewater treatment plants, in order to apply the produced Compost to arable lands in the proximity of the treatment plant, due to the high transportation costs and low selling price of the Compost, which make unprofitable the transportation of the Compost to places very far away from the plant.

c) Rotary Dryers or Fluidizing Bed Drying.

These processes palletize and reduce the water content of the sludge from 80 to less of 5% by using large amounts of external energy and using high priced fuels such as natural gas or fuel oil.

These processes have the advantage of offering the farmer a dry and non perishable product having a low water content and thus low transportation costs.

However, these processes have the disadvantage of increasing the production costs due to the high consume of energy, because if for each lb of dry sludge, there are consumed 8,000 BTU, then, for example, if the process starts with a filtered sludge having a solid content of 20%, then 4 tons of water must be evaporated for producing 1 ton of dry sludge, which consume 445 liters of fuel oil, equal to 500 m.sup.3 of natural gas.

It is important to note that if the price of natural gas is $4.00 USD/MBTU, then 1 ton of dry sludge would cost $71.68 USD including only the primary energy expenses, and if the costs of other elements are included such as electricity, work force, materials, maintenance parts and other direct and indirect costs, the total product cost would be as much as $126.50 USD/ton, which is higher than the price of a chemical fertilizer such as ammonium sulfate, priced at $85.00 USD/ton granulated and having a nitrogen content of 21% compared with the major nutrient content of the dry sludge of 6.0% maximum.

d) Lime Stabilization.

In the lime stabilization process, lime is added to sludge having a solid content of 20% in sufficient quantity to raise the pH to 12 or higher. The pH creates an environment that is not adequate for the survival of microorganisms. Consequently, the sludge will not putrefy or create odors so long the pH is maintained at this level.

This process is becoming popular in US due to its low inversion cost, but for this process to operate economically, it has to be subsided, because generally, the sludge producer—the municipality—pays the treatment company near $160.00 USD by each ton of dry sludge in order to cover the expenses of the treatment company.

In this process, the treatment company receives the sludge as received from the water treatment plant thickeners, that is, with a solid content of 2.0%, therefore, the treatment company must invoice the treatment plant for the sludge pumping, filtering etc. and at the same time it must generate some profit so that it allows the treatment company to recover the inversion costs during the time it serves to the municipality.

Finally, lime stabilization does not destroy the organics necessary for bacterial growth. Therefore the sludge can not be used and must be treated with an excess of lime or disposed of before the pH drops significantly.

e) Sludge Incineration.

The sludge incineration process, has some advantages when compared with the sludge drying process, due to the fact that during the incineration it is used the combustion heat of the organic matter contained in the sludge, thus decreasing the energy consumption and furthermore, the air volumes to be heated and moved are significantly smaller which constitute an additional energy consumption decrease.

The main disadvantages of the sludge incineration process are related with the drying of the sludge, mainly because of the following problems: the investment, operation and maintenance costs of the incineration step are higher than the costs of the drying step, furthermore, the incineration process is highly pollutant to the environment, because the gaseous effluents produced by the incinerator are very acidic, and contain very toxic metallic compounds such as lead, arsenic, cadmium and mercury (normally present in the urban wastewater), which are considered as very dangerous for the environment and for the health of humans and animals. Additionally, the disposal of the ashes generated by the incinerator and recollected in the ash separator, have the same polluting agents as the gaseous effluents and therefore the use of said ashes for the production of cement for example, is very restrained.

f) Other Processes.

There are other processes for the treatment of sludge and animal dry excrement which add NPK major nutrients and uses the same raw materials as the fertilizer industry, and sometimes, the reaction heat for heating the mass and evaporating the water contained in the sludge, specifically the process of the U.S. Pat. No. 6,159,263, in which the untreated sludge having a solid content of 20% are diluted with 30% of water, and when liquefied, are pumped to a tubular reactor working at 75 p.s.i in which are feed phosphoric acid, sulfuric acid and ammonia, which react and generate sufficient heat to raise the temperature of the mass to 150.degree. C.

The mass exiting the tubular reactor is discharged to a rotary granulator working at atmospheric pressure, by which part of the water is evaporated by flashing when the pressure is reduced.

Subsequently the mass is dried using external energy, requiring the equivalent of 15 million BTU by each ton of dry sludge, therefore, this process consume the 85% of the energy that a common sludge drying process would consume.

U.S. Pat. No. 5,411,586 discloses a process in which hen drop is granulated with the aid of formaldehyde-urea diluted resins and finally drying the produced granules using external energy. This process has a high energy consume and therefore it does not have any advantage compared with the above referred processes.

U.S. Pat. No. 4,038,180 discloses a process in which the filtered sludge having a solid content of 20%, is mixed with acids or mineral anhydrides such as phosphoric or sulfuric, and the acid mix is feed to a fertilizer granulation plant, in which the acids are neutralized with ammonia and based on the neutralization heat, it is evaporated an 85% of the water contained in the sludge.

This process has serious corrosion issues and problems controlling granulation, because there are not included the mechanisms needed for the generation of intermediate acid ammonium sulfate required before the final ammoniating and before its transformation into neutralized ammonium sulfate.

All ammonium sulfate granulation processes known such as TVA in US, INCITEC in Australia, Cominco and ESSO Chemicals in Alberta, Canada, use metallic additives derived from zinc and aluminum, and have the common inconvenient of having high fixed investment costs, due to high recycle volumes and to the specialized materials needed for avoiding corrosion, because the high working temperatures cause the plastics to corrode in presence of the diluted acids and the hot acid ammonium sulfate.

U.S. Pat. No. 4,081,366 discloses a process in which a formaldehyde-urea polymer is added in order to co-polymerize and separate organic matter contained in the sludge by filtration, when an olygomer having a high nitrogen content (21% dry basis) is formed, comprised by 50% of UREA-FROM and 50% of sludge organic matter. The filtrated solids have a water content of approximately 80%, and consequently this process is very costly.

As it can be seen, there have been many attempts for achieving the best use of the sludge produced by water treatment plants, mainly due to the great importance of the resource.

Only in U.S. there were produced seven and a half million tons of dry sludge in 1998, product of processing more than 35,000 million wastewater gallons by day and 60% of the 7.5 million tons of dry sludge were recycled to arable lands for improving the quality of the soil. The EPA estimates that in the year 2010 there will be generated 8.2 million tons of dry sludge, 70% of which will be applied to arable lands, considering its high nutrient content.

Applicant developed a process in which the energy consume is reduced a 90% thanks to the addition of a special filtration step in which the water content is reduced a 50% and the remaining water is evaporated by the exothermic reaction occurring in the process.

Additionally, applicant's process include mechanisms that allow some of the by products generated by some of the reactions, to adsorb crystallization water and reduce the humidity of the mass without using external energy.

SUMMARY OF THE INVENTION

It is a main object of the present invention to provide a process for transforming liquid sludge (98% moisture) into a granular high analysis fertilizer (30-50% NPK content) in which the energy consume is reduced a 90%.

It is also a main object of the present invention to provide a process for treating sludge which includes a special filtration step in which the water content in the cake is reduced a 50%, comparatively whit other traditional processes of sludge filtration.

It is another object of the present invention to provide a process for treating sludge in which the water remaining in the cake, after the special filtration step, is evaporated by an exothermic reaction occurring in the process.

It is also another object of the present invention to provide a process for treating sludge which include mechanisms that allow some of the by products generated by some of the reactions such as gypsum, to adsorb crystallization water and reduce the free humidity of the mass without using external energy.

These and other objects and advantages of the process for treating sludge of the present invention will become apparent to those persons having an ordinary skill in the art, from the following detailed description of the invention.

DETAILED DESCRIPTION OF THE INVENTION

Figure 1:
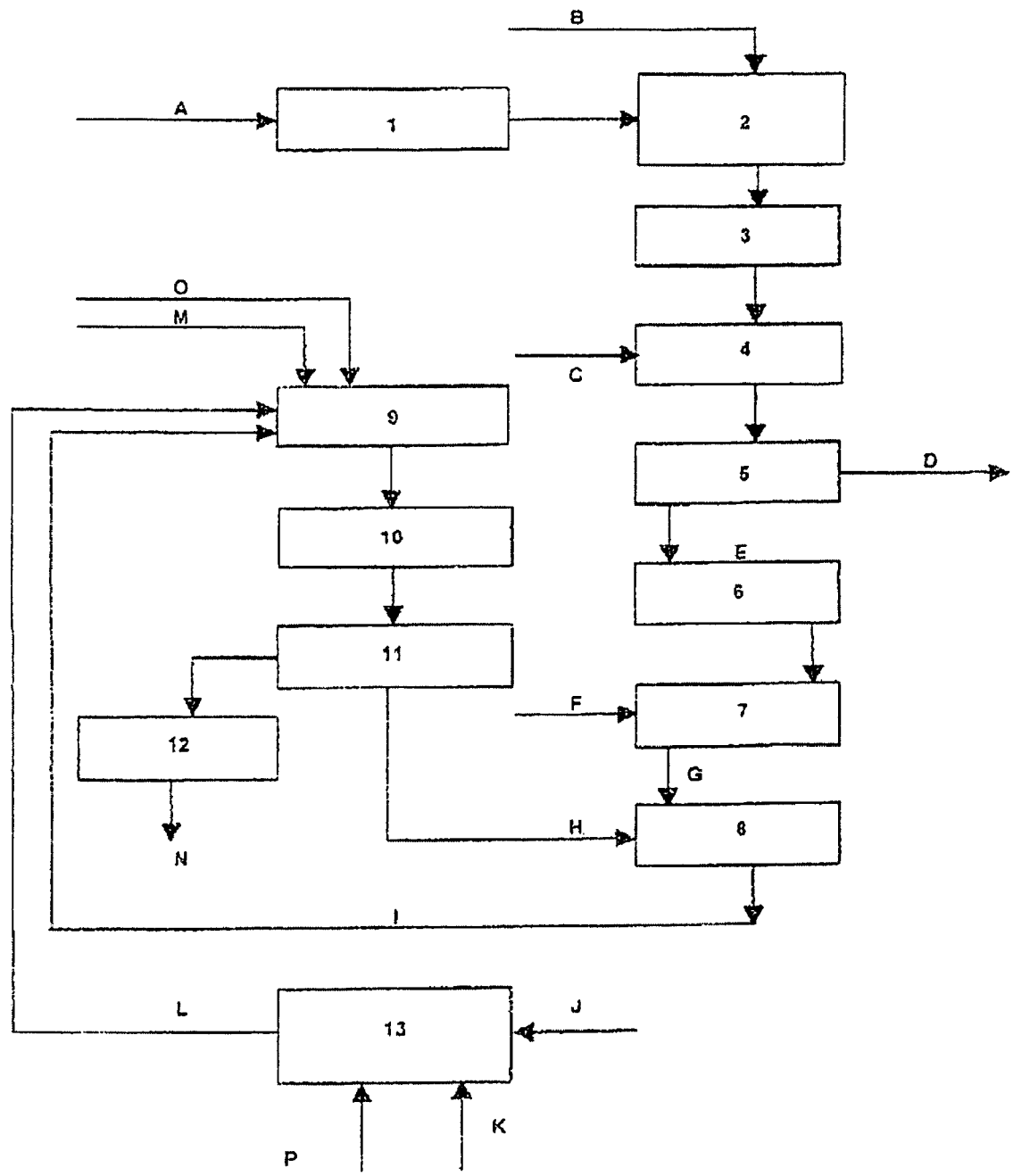
FIG. 1 is a scheme of the process of the present invention.

The process for treating sludge of the present invention comprise the following steps:

a) disinfecting the sludge A exiting the thickeners of water treatment plants, normally having a solid content of less than 2% by heating the sludge at a temperature of 70° C. by means of a heat exchanger 1 installed over the pipes entering to the plant where the sludge will be treated;

b) feeding the hot sludge to a static mixer 2 and adding mineral acids selected form the group consisting of: phosphoric acid, sulfuric acid, nitric acid, hydrochloric acid or a mix thereof, in an amount of between about 1.0% to 500% in dry sludge basis, preferably phosphoric acid B at a 54% in an amount of 70% to 90% in dry sludge basis in order to decrease the pH of the mass at 2.0 or less, thus guaranteeing that all pathogen microorganisms are destroyed;

c) feeding the hot sludge mixed with the phosphoric acid or any other of the above referred mineral acids to an agitated tank 3 and stir the mix during a minimum time of 30 minutes in order to guarantee that the sludge is completely disinfected.

d) neutralizing the acids added in step b) by feeding a lime slurry enriched with magnesium hydroxide having a solid content of 20% C into a second agitated tank 4, until the pH of the sludge reaches a final value of between 7.3 to 7.5, thus assuring that all the phosphoric acid is transformed into a mix of 85% of tri-calcium phosphate and 15% of di-calcium phosphate.

During the addition of the magnesium and calcium slurry there are obtained the following reactions:

(1)

Sulfuric acid Calcium hydroxide Calcium sulfate

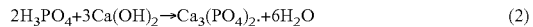
(2)

Phosphoric Calcium Tri-calcium water acid hydroxide phosphate

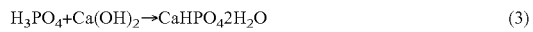
(3)

Phosphoric Calcium di-calcium acid hydroxide phosphate

The residence time of the sludge inside the agitated tank must be of approximately 15 minutes.

e) filtering the product obtained in step d) by means of a high pressure industrial filter 5 in order to reduce its water content and recuperate a cake containing insoluble matter such as: insoluble sludge solids and insoluble calcium phosphates formed. It is important to note that the calcium phosphate obtained in reactions 2 and 3 acts as an excellent filtering aid since the sludge, due to its inherent incompressible and gelatinous characteristics is very difficult to filter. The disinfected and practically organic matter and phosphate free filtered water D is recycled to the water treatment plant.

f) transferring the cake E obtained in step e) which contains an average content of 45% of water, 27% of sludge matter and 28% of calcium phosphate, to a crumbling machine in order to break the hard cake consistency;

g) feeding the crumbled cake and sulfuric acid F at a concentration of between 94 to 98% into a pug mill 7 in order to transform all the tri-calcium phosphate and bi-calcium phosphate into phosphoric acid and calcium sulfate in accordance with the following reactions:

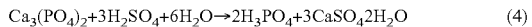
(4)

(5)

Reactions (4) and (5) are highly exothermic, generating a calorific energy of 337 K cal/mol of $Ca_3(PO_4)_2$, thus heating the thus obtained mass to a temperature of 115° C. and evaporating 90% of the water contained in the mass. Furthermore, reactions (4) and (5) produce calcium sulfate which has the property of fixing crystallization water when it is cold, thus further reducing the free water content of the mass and improving the physical and agronomic characteristics of the final product.

h) feeding the mass obtained in step g) to a ribbon mixer G and adding grinded recycled fines and thick matter H produced by a granulator 9 and separated by a rotary screen 11.

i) feeding the mass 1 obtained in step h) with anhydrous ammonia O, potassium salts M and pre-neutralized phosphoric acid L to a granulator 9 by controlling the additions of ammonia and pre-neutralized phosphoric acid L until obtaining a final molar relation of ammonia/phosphoric acid of between about 1.580 and 1.620 in order to minimize ammonia emissions and complete the neutralization of the phosphoric acid until obtaining a molar relation such that by each two molecules of di-ammonic phosphate there is one molecule of mono-ammonic phosphate and obtain a granulated product.

The pre-neutralized phosphoric acid is produced by feeding phosphoric acid P, sulfuric acid K and ammonia J to a pre-neutralizer 13 by controlling ammonia J additions until obtaining an ammonia/phosphoric acid of between about 1,450 and 1.500 in order to achieve a maximum solubility of the ammonium phosphates and reducing water content. Furthermore, the reaction between ammonia J and phosphoric acid P is highly exothermic, thus generating sufficient energy for raising the temperature at 116° C. and evaporating a great amount of the water contained in the phosphoric acid P.

A blower suctions gas produced by the granulator containing ammonia, air and dust which is conduced into a washing and recuperating system comprising a humid cyclone followed by a Ventury scrubber washer, both of which are feed with fresh phosphoric acid in order to capture the dust as ammonium, phosphates, sludge dry solids and recover the ammonia gas as mono-ammonic phosphate.

The phosphoric acid exiting the washing and recuperating system is received into a pump equipped tank which recycles most of the phosphoric acid to the washing and recuperating system, but a small amount is feed to the pre-neutralizer into which it reacts with ammonia.

j) The granulated product obtained in step e) is feed to a dryer 10 in order to reduce the water content until 3.0%.

k) feeding the dry granulated product to a rotary screen 11 which classifies the dry product by size as "normal size, "above normal size" and "below normal size" which are predetermined by client. The product having an above normal size is grinded and mixed with product having a size below normal and is recycled to the ribbon mixer of step h).

l) the product having a "normal size" is transferred to a rotary cooler in order to decrease the final product temperature for a better storage and commercialization.

The final product of the process of the present invention comprises a NPK type granulated product which can be used as a fertilizer having a sludge solid content of between about 10% to 25% and a major nutrient content (NPK) of between about 30% to 50% comprising among others:

11.5% of nitrogen as N, 36% of phosphorous as $P_2O_5$, 0.0% of potassium as $K_2O$ and a sludge solid content of 15%.

10% of nitrogen as N, 30% of phosphorous as $P_2O_5$, 0.0% of potassium as $K_2O$ and a sludge solid content of 20%

10% of nitrogen as n, 25% of phosphorous as $P_2O_5$, 5% of potassium as $K_2O$ and a sludge solid content of 20%

10% of nitrogen as n, 20% of phosphorous as $P_2O_5$, 10% of potassium as $K_2O$ and a sludge solid content of 20%

It is important to emphasize that the acids added in the disinfecting step don't pollute the filtering water but serve as a disinfecting agent instead, since there are transformed to insoluble compounds which are retained in the filtering step and become part of the final product.

The calcium sulfate obtained in the reactions 1, 4 and 5 is an excellent filtering aid, by which the filtering step is optimized thus obtaining a water content in the cake of approximately 45% compared with the water content of approximately 80% that would be obtained without using any filtering aid. Furthermore, it is possible to use smaller filters because the gelatinous consistence and incompressible property of the cake is eliminated.

The disinfecting step provide the advantage that during the subsequent steps of the process, a biologically inert material is manipulated, which is not harmful to the operators health, and additionally the filtering aids reduce the quantity of water to be eliminated in order to obtain a completely dry product.

The process of the present invention has the following main changes and advantages compared to the process of the patent application Ser. No. 10/366,057 (previous process) from which this process is a continuation in part:

It was added the crumbling step for breaking the hard consistency of the cake produced by the filtering step and optimizing the further handling of the cake during the next step of the process.

It was eliminated step d) of the previous process which followed the filtering step and instead it was substituted by step g) of the process of the present invention, in order to avoid water additions and transform all the tri-calcium phosphate and bi-calcium phosphate into a solid mix of phosphoric acid and calcium sulfate enriched with sludge solids.

It was added a mixing step in which the mass obtained in step g) was mixed with grinded recycled fines and thick matter produced by a granulator and separated by a rotary screen.

Thanks to step g) and h) of the process of the present invention, it is possible to feed the mass to the granulator as a wet solid and since the sulfuric acid is added to the pug mill of step h) it is possible to eliminate the reactor of step d) of the previous process in which it is added sulfuric and phosphoric acid.

By adding phosphoric acid to the pre-neutralizer, it is avoided to add it to the pug mill of step g) into which it would be necessary produced acid ammonium sulfate which is highly corrosive as in step d) of previous process.

By adding a mix of sulfuric acid and phosphoric acid to the pre-neutralizer, it is increased the water evaporation and the final product is enriched with a content of ammonium sulfate of between about 10% to 20% lowering production and inversion costs.

EXAMPLE 1

1) 84.175 kgs of sludge having a solid content of 4.5% are heated at 70° C. inside a tube type heater and transferred to a static mixer in which there are acidified by adding 3.139 kg of phosphoric acid at 54.2% in such way that by 100 kg of sludge in dry basis there are added 82.867 kg of base phosphoric acid until obtaining a pH of 2.0 or less.

2) The acidified mass obtained in the static mixer is discharged into an agitated tank in order to complete the sludge disinfection. The permanence time of the acidified mass inside the agitated tank is 30 minutes.

3) The hot acidified sludge free of pathogen microorganisms is transferred to an agitated tank into which are added 12.535 kg of a lime slurry having a calcium hydroxide content of 20%. The residence time of the sludge inside the agitated tank is 20 minutes in order to complete the reaction between the phosphoric acid and calcium hydroxide and obtain insoluble calcium phosphates comprising an 85% of tri-calcic phosphate and 15% of di-calcic phosphate and controlling the final pH of the mass at between about 7.3 and 7.5.

4) The mass exiting the agitated tank is feed to a continuous filter operated at a high pressure, in order to separate the solids from the water and obtain a final cake having a weight of 14.904 kg, a water content of 45%, a solid content of 27% and 28% of calcium phosphates. The water practically free of phosphoric acid and organic matter is recycled to the water treatment plant.

5) The filtered cake is transferred to a crumbling machine in order to crumble it and be feed to a pug mill in which it is reacted with 3.416 kg of sulfuric acid at a concentration of 93% in order to transform the calcium phosphates contained in the crumbled filtered cake and formed in the agitated tank into phosphoric acid and calcium sulfate.

6) The mix obtained in the last step is transferred to a ribbon mixer and adding recycled matter comprising grinded recycled fines and thick matter produced by a granulator system comprised by: a granulator, a rotary drier, a vibrating screen and a rotary drier.

7) Feeding the mix obtained in step 6) to the granulator into which there are added 0.433 kg of anhydride ammonia and pre-neutralized phosphoric acid until it is obtained a ammonia/phosphoric acid molar relation of 1.450.

The ammonia feed to the granulator completes the neutralization of the phosphoric acid until a molar relation of 1.620 is obtained.

The pre-neutralized phosphoric acid is produced by a pre-neutralizer by feeding 7.432 kg of phosphoric acid, at a concentration of 54.2% and 1.732 kg of anhydride ammonia.

Afterwards, the granulated product is transferred to the rotary dryer, and finally the dried granulated product is transferred to the vibrating sieve in order to classify the dry product by size as "normal size, "above normal size" and "below normal size". The normal size product is stored, the product having an above normal size is grinded and mixed with product having a size below normal and is recycled to the ribbon mixer of step 6.

The final product obtained comprises 19.426 kg of a product having: 19.5% of solids coming from sludge, 10% of nitrogen, 30% of phosphoric acid and 3% of water.

EXAMPLE 2

For the present example, steps 1-6 of example 1 are equally performed, applying the same operating conditions and adding the same quantity of reactives.

In this example there are incorporated to the final product potassium salts and enriched with ammonium sulfate, by which the production capacity is increased and the production costs are reduced, thus obtaining 25.046 kg of final product compared with 19.426 kg of final product produced in example 1.

In this example there are feed:
- 4.198 kg of potassium chloride having a $K_2O$ content of 60%, 0.300 kg of anhydride ammonia and pre-neutralized phosphoric acid to the granulator.
- 2.452 kg of sulfuric acid at a concentration of 93%, 6.149 kg of phosphoric acid at a concentration of 54.2% and 2.351 kg of anhydride ammonia to the pre-neutralizer.

The product exiting the granulator transferred to a rotary drier and afterwards to a sieve in order to classify the product by sizes.

The sieved ground fines and thick matter are recycled to the ribbon mixer and the "normal size" product is transferred to a rotary cooler for the conditioning and commercialization of the final product.

The final product of this example #2 contains: 15.1% of solids coming from sludge, 10% of nitrogen, the phosphoric acid content is reduced until 20%, 10% of $K_2O$ and 3% of water.

What is claimed is:

1. A process for treating sludge comprising:
    a) disinfecting the sludge by heating the sludge at a temperature of 70° C.;
    b) feeding the heated sludge to a static mixer and adding a mineral acid comprising phosphoric acid in order to decrease the pH of the sludge to less than 2.0, thus destroying pathogen microorganisms present in the sludge;
    c) feeding the sludge obtained in step b) to an agitated tank and stirring the mix in order to further disinfect the sludge;
    d) neutralizing the mineral acid added in step b) by feeding a lime slurry enriched with magnesium hydroxide until the pH of the sludge reaches a final value of between 7.3 to 7.5, and transforming the phosphoric acid into a mix of tri-calcium phosphate and di-calcium phosphate;
    e) filtering the product obtained in step d) in order to remove water and reduce the product's water content, and recuperate a hard filter cake containing insoluble matter;
    f) crumbling the cake obtained in step e) in order to break the hard filter cake consistency;
    g) further reducing the water content of the crumbled cake by producing an exothermic reaction between the crumbled cake containing tri-calcium phosphate and bi-calcium phosphate, and sulfuric acid, thus evaporating 90% of the water content and transforming the tri-calcium phosphate and bi-calcium phosphate into phosphoric acid and calcium sulfate;
    h) feeding the product obtained in step g) to a mixer, adding grinded recycled fines and thick matter produced by a granulator system, and mixing the product;
    i) feeding the product obtained in step h) to a granulator with anhydride ammonia, potassium salts and pre-neutralized phosphoric acid, and granulating the product;
    j) drying the granulated product obtained in step i) in order to reduce the water content to 3.0% by weight; and
    k) sieving the granulated product obtained in step j), classifying the final sieved product by a desired size, and recycling the product not having the desired size to step h).

2. The process for treating sludge in accordance with claim 1, wherein in step a) the sludge is heated by a heat exchanger installed over pipes entering to the plant where the sludge will be treated.

3. The process for treating sludge in accordance with claim 1, wherein in step b) the mineral acid further comprises sulfuric acid, nitric acid, hydrochloric acid or a mix thereof.

4. The process for treating sludge in accordance with claim 1, wherein in step b) the mineral acid is added in an amount of between about 1.0% to 500% by weight of dry sludge.

5. The process for treating sludge in accordance with claim 1, wherein in step b) 54% phosphoric acid is added in an amount of between about 70% to 90% by weight of dry sludge.

6. The process for treating sludge in accordance with claim 1, wherein the in step c) the mix is stirred in an agitated tank for at least 30 minutes.

7. The process for treating sludge in accordance with claim 1, wherein in step d) the lime slurry is enriched with magnesium hydroxide having a solid content of 20% by weight.

8. The process for treating sludge in accordance with claim 1, wherein in step d) the phosphoric acid is transformed into a mix of 85% by weight tri-calcium phosphate and 15% by weight di-calcium phosphate.

9. The process for treating sludge in accordance with claim 1, wherein step d) is carried out in a second agitated tank for at least 15 minutes.

10. The process for treating sludge in accordance with claim 1, wherein step e) is carried out by a high pressure industrial filter.

11. The process for treating sludge in accordance with claim 1, wherein the di-calcium phosphate and tri-calcium phosphate obtained in step d) a filtering aid in step e).

12. The process for treating sludge in accordance with claim 1, wherein in step e) the removed filtered water is recycled to a water treatment plant.

13. The process for treating sludge in accordance with claim 1, wherein the cake obtained in step e) comprises about 45% by weight of water, 27% by weight of sludge matter and 28% by weight of calcium phosphate.

14. The process for treating sludge in accordance with claim 1, wherein step f) is carried out by a crumbling machine.

15. The process for treating sludge in accordance with claim 1, wherein in step g) 94% to 98% sulfuric acid is added, and the reaction is carried out in a pug mill.

16. The process for treating sludge in accordance with claim 1, wherein in step g) calcium sulfate is further produced, the calcium sulfate having the property of a dihydrated form when cooled, thus further reducing the free water content of the cake.

17. The process for treating sludge in accordance with claim 1, wherein step h) is carried out by a ribbon mixer.

18. The process for treating sludge in accordance with claim 1, wherein in step i) the additions of ammonia and pre-neutralized phosphoric acid are controlled until obtaining a final molar relation of ammonia/phosphoric acid of between about 1.580 to 1.620 in order to minimize ammonia emissions and complete the neutralization of the phosphoric acid until obtaining a molar relation such that by each two molecules of di-ammonic phosphate there is one molecule of mono-ammonic phosphate in the granulated product.

19. The process for treating sludge in accordance with claim 1, wherein in step i)
the pre-neutralized phosphoric acid is produced by feeding phosphoric acid, sulfuric acid and ammonia to a pre-neutralizer by controlling ammonia additions until obtaining an ammonia/phosphoric acid molar relation of between about 1,450 to 1.500 in order to achieve a maximum solubility of the ammonium phosphates and reducing water content, and
the reaction between ammonia and phosphoric acid is highly exothermic, thus generating sufficient energy for raising the temperature to 116° C. and further evaporating the water contained in the phosphoric acid.

20. The process for treating sludge in accordance with claim 1, wherein in step i)
a blower suctions gas produced by the granulator, the gas comprising ammonia, air and dust, and
the gas is conducted into a washing and recuperating system comprising a humid cyclone followed by a Ventury scrubber washer, the system fed with fresh phosphoric acid in order to capture the dust as ammonium, phosphates, and sludge dry solids, and recover the ammonia gas as mono-ammonic phosphate.

21. The process for treating sludge in accordance with claim 1, wherein:
in step i) the pre-neutralized phosphoric acid is produced by feeding phosphoric acid, sulfuric acid and ammonia to a pre-neutralizer by controlling ammonia additions until obtaining an ammonia/phosphoric acid molar relation of between about 1,450 to 1.500 in order to achieve a maximum solubility of the ammonium phosphates and reducing water content, and the reaction between ammonia and phosphoric acid is highly exothermic, thus generating sufficient energy for raising the temperature to 116° C. and further evaporating the water contained in the phosphoric acid;
in step i) a blower suctions gas produced by the granulator, the gas comprising ammonia, air and dust, the gas is conducted into a washing and recuperating system comprising a humid cyclone followed by a Ventury scrubber washer, the system fed with fresh phosphoric acid in order to capture the dust as ammonium, phosphates, and sludge dry solids, and recover the ammonia gas as mono-ammonic phosphate; and
the phosphoric acid exiting the washing and recuperating system is received into a pump equipped tank, which recycles most of the phosphoric acid to the washing and recuperating system but feeds a small amount to the pre-neutralizer into which the phosphoric acid reacts with ammonia.

22. The process for treating sludge in accordance with claim 1, wherein in step k)
the dry granulated product is classified by size as "normal size", "above normal size", and "below normal size", the sizes being predetermined by a client,
the product having an "above normal size" is grinded and mixed with the product having "below normal size" and is recycled to step h), and
the product having a "normal size" is transferred to a rotary cooler in order to decrease the final product temperature.

* * * * *